Jan. 10, 1956 — F. KOVAC — 2,730,035
BAKING DEVICE
Filed March 18, 1952 — 2 Sheets-Sheet 1

Inventor:
Ferdinand Kovac
By:
Michael S. Striker
agt

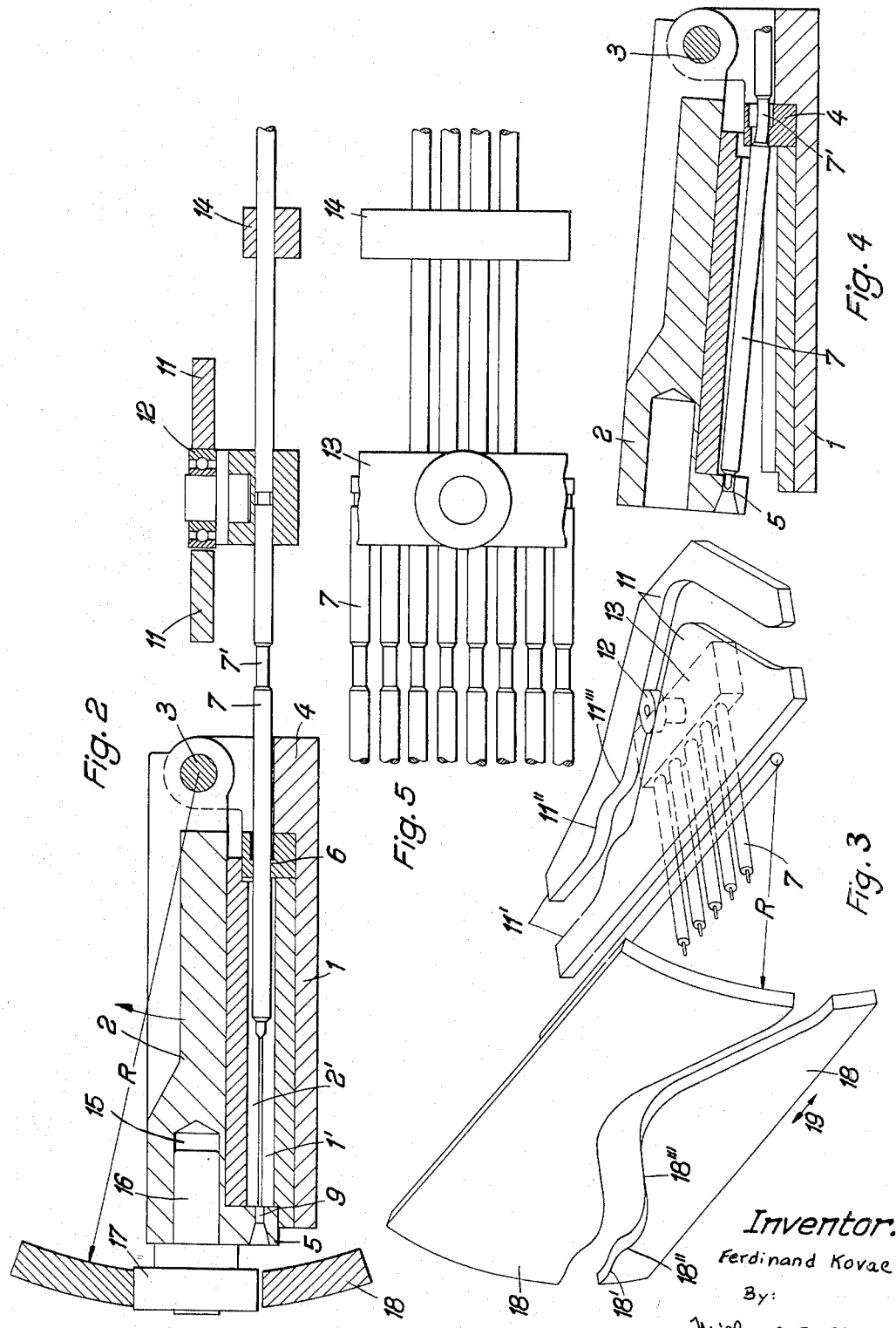

United States Patent Office 2,730,035
Patented Jan. 10, 1956

2,730,035
BAKING DEVICE

Ferdinand Kovac, Hannover, Germany, assignor to Werner Bahlsen, Hannover, Germany Application March 18, 1952, Serial No. 277,269

Claims priority, application Germany March 24, 1951

10 Claims. (Cl. 99—373)

The present invention relates to a baking device and more particularly to a baking form provided with movable cores for the production of hollow waffles.

In known devices of that type forms consisting of a stationary and a movable part the form halves engage each other along the horizontal plane of symmetry of the space enclosed by the form. This arrangement has the disadvantage that overflowing dough enters the interior of the waffles closing or reducing the openings in the waffles which makes filling difficult. Furthermore, the cores which are required for hollow baked products are inaccurately guided since the guiding bores therefor consist of halves partly located in one part of the form and partly located in the other half of the form.

It is the object of the present invention to overcome these disadvantages by providing a baking device comprising a top form and a bottom form abutting against each other along edges spaced a shorter distance from one of said forms than from the other of said forms.

It is another object of the present invention to provide a baking device comprising a top form having a front wall and a bottom form having a rear wall, the front and rear walls, respectively, being provided with aligned bores permitting sliding of a movable core into and out of the baking device, such undivided bores assuring a good fit of the core preventing overflow of dough.

It is a further object of the present invention to provide the front and rear walls of the baking device with inclined faces so that the baked product may be easily separated from the form.

It is a still further object of the present invention to provide bendable cores so that slight opening of a pivoted top form half is possible while the cores are supported in bores in the front and rear wall, respectively, whereby the baked product is separated from the bottom form.

It is still another object of the present invention to provide cam means for the operation of the pivoted top form simultaneously with the retraction of the movable cores.

It is still a further object of the present invention to shape the cam tracks of such cam means in such manner that the movable cores perfom a short advance movement while the pivoted top form is being opened in order to separate the baked product from the rear wall of the bottom face.

With these objects in view the present invention mainly consists in a baking device comprising a bottom form having horizontal bottom walls and an upwardly extending rear wall, and a top form including a horizontal top wall and a downwardly extending front wall. Preferably the top form is pivoted to the rear end of the bottom form.

Horizontal bores are provided in the rear wall and the front wall, respectively, in which elongated cylindrical core members are mounted longitudinally slidably. Such core members are preferably consisting of a resiliently bendable material permitting a slight opening of the top form although the core members engage the bores in the front wall of the top member and in the rear wall of the bottom member.

Separate cam means are provided for pivoting the top form to an open position, and for retracting the movable cores. Preferably the cam means move together relatively to the form so that the opening of the top form half and the retracting of the cores is carried out in a predetermined order.

A first cam track engaging a follower member on the top form is shaped in such manner as to effect a slight opening and closing of the top form while the bendable cores are held by a second cam track in an advanced position engaging the front and the rear wall, respectively. By this short lifting operation the baked product is separated from the bottom form.

Thereupon the top form is completely opened by the first cam track, and during such opening movement the cores are first retracted, then advanced for a short distance, then retracted again by the second cam track so that the baked product is pushed for a short distance in a forward direction and separated from the rear wall of the bottom form.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 2 is a vertical cross-section through a modified embodiment of the present invention;

Fig. 3 is a perspective schematic view of the embodiment shown in Fig. 2;

Fig. 4 is a vertical cross-section through a device according to Fig. 2 with the top form slightly lifted;

Fig. 5 is a partial plan view of the embodiment shown in Fig. 2; and

Figure 6:
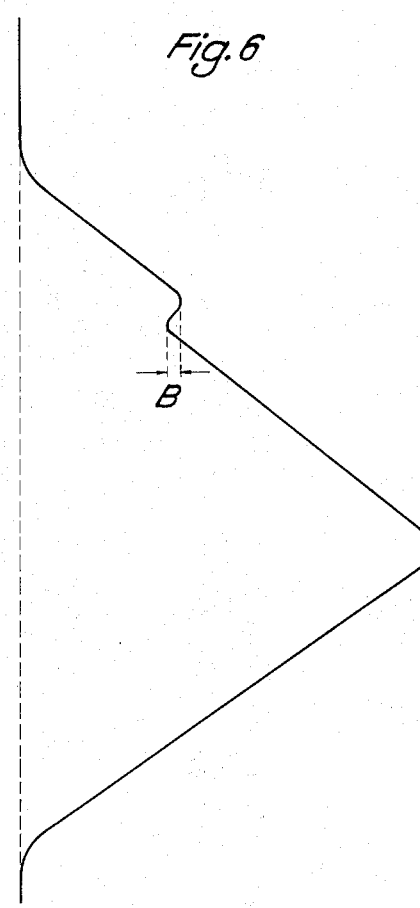
Figure 7:
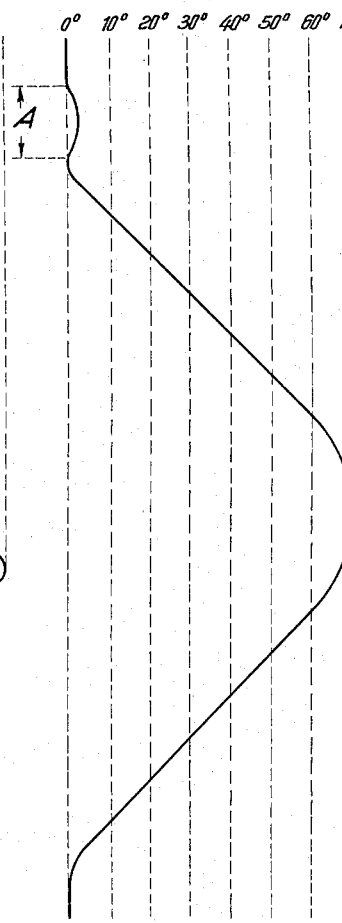

Figs. 6 and 7 diagrammatically shows the pattern of the movement of the cores in relation to the movement of the top form.

Figure 1:
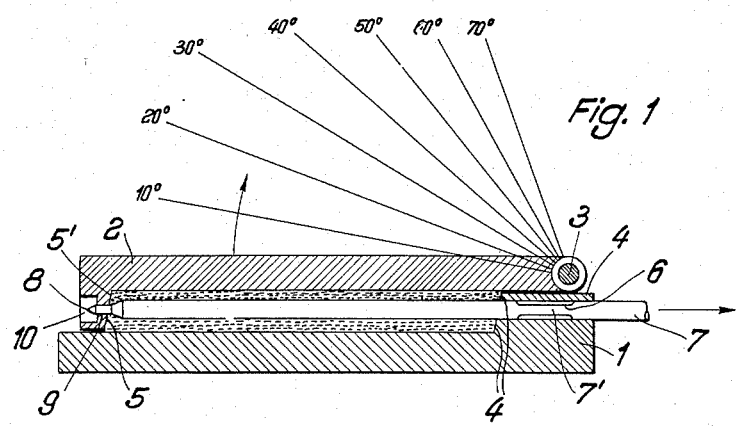
Fig. 1 is a vertical cross-section through a baking device according to the present invention.

Referring now to the drawings Fig. 1 shows a baking device comprising a stationary bottom form 1 and mounted thereon, pivotable about a shaft 3, a top form 2. The bottom member 1 is provided with a rear wall 4 having an inclined face 4', while the top member is provided with a front wall 5 having an inclined face 5'. A cylindrical bore or hole 6 extends in the rear wall 4 slidingly supporting a movable core 7, the front end of which has an end portion 8 of reduced diameter projecting into a cylindrical bore 9 in the front wall 5. Bore 9 may have a widened outer portion 10.

A plurality of bores 9 and 6 may be arranged along horizontal lines so that a plurality of core members 7 may be provided. Each core member 7 may be provided with a constricted portion 7', and since the core members consist preferably of a resiliently bendable material, the core members are bent at the constricted portion 7', as shown in Fig. 4 when the top form is slightly opened, the walls of the bores 9 constituting engaging means engaging the core members.

Referring now to Figs. 2 to 5 showing the operating means for moving the top form 2 simultaneously with the movement of the core members 7 the bottom form 1 is again provided with a rear wall 4 having a cylindrical or hole bore 6 in which core members 7 are slidably mounted. In the position shown in Fig. 2 the core member 7 is partly retracted. Such retraction is effected by the cam means 11 which guide a cam follower 12 which is rotatably mounted on a transversely extending connecting member 13 fixedly connecting a plurality of parallel core members 7, as clearly shown in Figs. 3 and 5. The rear ends of the movable core members are slidably supported in a guiding means 14. Ridges 1' of the bottom form extending parallel to and between two adjacent core members 7, and ridges 2' of the top form arranged oppositely the ridges 1' are provided for partly separating portions of the baked product.

The front wall 5 of the top form is provided with a bore 15 in which the shaft 16 of the cam follower 17 is slidably and rotatably mounted. Cam follower 17 moves along a cam track on the cam means 18. As clearly shown in Fig. 3 movement of the cam follower 17 on the cam track of the cam means 18 during relative movement of the cam means 18 and the top and bottom forms 1 and 2 will result in pivoting of the top form about pivoting axis 3. Movement of the cam follower 12 along the horizontal cam track of the cam means 11 during relative movement of the cam means 11 and the top and bottom forms will result in retracting of the movable core.

Preferably cam means 18 and 11 are rigidly connected and may be moved together by well known means in the direction of the arrow 19. For instance, rack bars extending in a horizontal plane in the direction of relative movement of the cam means and the cam followers, that is normal to the core members, may be secured to the cam means 18 and 11, and a drive shaft carrying pinions meshing with the rack bars may be arranged for driving the cam means.

If it is desired to move the form 1, 2, a rack bar may be secured to the bottom form so that the form 1, 2 may be moved by a driven pinion meshing with the rack bar relatively to stationary cam means 18 and 11. Since the lifting of the top form is affected by cam means 18 simultaneously with the movement of the core members effected by cam means 11, it is possible to shape the cam tracks in such manner that a particularly favorable cooperation of the cam means may be obtained.

Fig. 6 diagrammatically shows the movement of the movable cores during relative movement of cam means 11 and 18 with respect to the top and bottom forms 1 and 2. During the first part of the relative movement the core members are held in their advanced position engaging the bores 9 in the front wall 5 by a track portion 11'. An upwardly extending track portion 18' moves the top form to the slightly open position shown in Fig. 4, and a downwardly extending track portion 18'' closes the form again. During such slight opening movement for the distance A the core members are bent at the constricted portion 11 since the walls of the bores 9 constitute engaging means engaging the core members and the baked product is separated from the top face of the bottom member 1.

During further relative movement of the cam means 18, 11, and the top and bottom forms 1, 2, the core members are retracted by track portion 11'' and then again advanced by track portions 11''' for a distance B, while simultaneously the top form is being pivoted to a fully opened position which is possible since the front end of the core members 7 no longer engage the bores 9 in the front wall of the top form.

Advancing and retracting of the core members 7 by the track portions 11'' and 11''' effect separation of the baked product from the face 4' of the rear wall 4, while the opening of the top form 2 separates the same from the baked product which is still held by the core members 7 down to the bottom form 1.

Thereupon the top form is completely opened by the cam means 18, and the core members 7 are completely retracted by the cam means 11 until the front ends of the core members are located in the bores 6 of the rear wall 4. It is now possible to remove the baked product from the baking device and to move the top and bottom forms, and the cam means to the position required at the beginning of a baking operation.

It will be understood that each of the elements described above, or two or more together, may also find a useful application in other types of baking devices differing from the types described above.

While the invention has been illustrated and described as embodied in a baking device comprising a movable top form and retractable core members which are actuated by cam means to perform a simultaneous movement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A baking device, comprising, in combination, a bottom form having a front end and a rear end and including a horizontal bottom wall, two lateral first ridges and an upwardly extending rear wall, said rear wall being formed with at least one horizontal bore located between said lateral first ridges; a top form including a horizontal top wall, two lateral second ridges opposite said first ridges, and a downwardly extending front wall located opposite said rear wall, said front wall being formed with at least one horizontal bore arranged coaxial with said bore in said rear wall between said second ridges, said top form being pivotally mounted at said rear end of said bottom form and movable relatively to said bottom form between an angularly spaced position and a closing position in which the bottom edge of said front wall of said top form engages said bottom form, and the top edge of said rear wall of said bottom member engages said top form; at least one core member slidably mounted in said bores in said front and rear walls; first cam means located at the front end of said top form and having a first cam track; a first cam follower secured to said top member and engaging said first cam track on said first cam means, said first cam track being shaped so that said top form is pivoted to said angularly spaced position when said top and bottom forms, and said first cam means move relatively to each other in the direction of the pivoting axis of said top form; second cam means having a second cam track; and a second cam follower secured to said core member and engaging said second cam track on said second cam means, said second cam track being shaped so that during relative movement in said direction between said top and bottom forms, and said second cam means, said core member is moved between said advanced and said retracted positions thereof.

2. A baking device, comprising, in combination, a bottom form having a front end and a rear end and including a horizontal bottom wall, two lateral first ridges, and an upwardly extending rear wall, said rear wall being formed with at least one horizontal bore located between said lateral first ridges; a top form including a horizontal top wall, two lateral second ridges opposite said first ridges, and a downwardly extending front wall, said front wall being formed with at least one horizontal bore arranged coaxial with said bore in said rear wall between said second ridges, said top form pivotally mounted at said rear end of said bottom form and being movable relatively to said bottom form from an angularly spaced position to a closing position in which the bottom edge of said front wall of said top form engages said bottom form, and the top edge of said rear wall of said bottom member engages said top form; at least one core member slidably mounted in said bores in said front and rear walls; first cam means located at the front end of said top form and having a first cam track; a first cam follower secured to said top member and engaging said first cam track on said first cam means, said first cam track being shaped so that said top form is pivoted to said angularly spaced position when said top and bottom forms, and said first cam means move relatively to each other in the direction of the pivoting axis of said top form; second cam means having a second cam track; and a second cam follower secured to said core member and engaging said second cam track on said second cam means, said second cam track being shaped so that during relative movement in said direction between said top and bottom forms, and said second cam means, said core member is moved between said advanced and said retracted position thereof, said first cam means and said second cam means being connected for movement together in said direction, and said first cam track having the portion thereof corresponding to maximal angular displacement of said top form arranged oppositely the portion of said second cam track corresponding to said retracted position of said core member.

3. A baking device, comprising, in combination, a bottom form having a front end and a rear end and including a horizontal bottom wall having a top face, a plurality of lateral first ridges, and an upwardly extending rear wall having a face defining with said top face an obtuse angle, said rear wall being formed with a plurality of spaced cylindrical horizontal first bores, each first bore located between two of said first ridges; a top form including a horizontal top wall having a bottom face, a plurality of lateral second ridges opposite said first ridges, and a downwardly extending front wall having a face defining with said bottom face an obtuse angle, said front wall being formed with a plurality of spaced cylindrical horizontal second bores, each second bore being arranged coaxial with a first bore, each second bore being located between two of said second ridges, said top form being pivotally mounted at the rear end of said bottom form movably from a position angularly spaced from said bottom form to a closing position in which the bottom edge of said front wall of said top form engages said top face of said bottom wall of said bottom form, and the top edge of said rear wall of said bottom member engages said bottom face of said top wall of said top form; a plurality of elongated resiliently bendable cylindrical core members having front end portions, each core member being mounted in one of said second bores in said rear wall slidably from an advanced position in which said front end portion thereof projects into one of said first bores in said front wall, to a retracted position in which said front end portion is located in said bore in said rear wall, each core member having a constricted resiliently bendable portion located in the associated second bore in said rear wall of said bottom member in said advanced position of said core member; first cam means located at the front end of said top form and having a first cam track; a first cam follower secured to said top member and engaging said first cam track on said first cam means, said first cam track being shaped so that said top form is pivoted to said angularly spaced position when said top and bottom forms, and said first cam means move the pivoting axis of said forms relatively to each other in the direction of top form; a connecting member connecting the rear ends of said core members and located spaced from said top and bottom forms; second cam means having a second cam track; and a second cam follower secured to said connecting member and engaging said second cam track on said second cam means, said second cam track being shaped so that during relative movement between said top and bottom forms, and said second cam means, said core members are moved between said advanced and said retracted position thereof, said first cam means and said second cam means being connected for movement together relatively to said top and bottom forms, and said first cam track having the portion thereof corresponding to maximal angular displacement of said top form arranged oppositely the portion of said second cam track corresponding to said retracted position of said core member.

4. A baking device, comprising, in combination, a bottom form having a front end and a rear end and including a horizontal bottom wall, two lateral first ridges, and an upwardly extending rear wall, said rear wall being formed with at least one horizontal bore located between said lateral first ridges; a top form including a horizontal top wall, two lateral second ridges opposite said first ridges and a downwardly extending front wall, said front wall being formed with at least one horizontal bore arranged coaxial with said bore in said rear wall between said second ridges, said top form pivotally mounted at said rear end of said bottom form and being movable relatively to said bottom form between an angularly spaced position and a closing position in which the bottom edge of said front wall of said top form engages said bottom form, and the top edge of said rear wall of said bottom member engages said top form; at least one elongated resiliently bendable cylindrical core member slidably mounted in said bores in said front and rear walls; first cam means located at the front end of said top form and having a first cam track; a first cam follower secured to said top member and engaging said first cam track on said first cam means, said first cam track being shaped so that said top form is pivoted to said angularly spaced position when said top and bottom forms, and said first cam means move relatively to each other in the direction of the pivoting axis of said top form; second cam means having a second cam track, said first cam means and said second cam means being connected for movement together relatively to said top and bottom forms in a direction normal to said core member; and a second cam follower mounted on said connecting member and engaging said second cam track on said second cam means, said second cam track being shaped so that during relative movement between said top and bottom forms, and said second cam means, said core member is moved between said advanced and said retracted position thereof, said first cam track having a first track portion extending upwardly corresponding to a slight angular displacement of said top form, a second downwardly extending track portion corresponding to a movement of said top form to said closing position thereof, and a third upwardly extending track portion ending at a point of said first cam track spaced farthest from said bottom form and corresponding to the maximum angular displacement of said top form, and said second cam track having a first straight track portion horizontally extending normal to said elongated core member and having such length that said top form is raised and closed by said first and second track portions of said first cam track while said core member is held in said advanced position thereof by said first horizontally extending straight track portion of said second cam track, while resiliently bending in said bore in said rear wall a second horizontally extending track portion extending in a rearward direction away from said rear wall, a third horizontally extending track portion extending for a short distance in a forward direction toward said rear wall, and a fourth horizontally extending track portion extending in a rearward direction away from said rear wall for moving said core member to said retracted position thereof, the end of said fourth horizontal track portion being located substantially opposite the end of said third track portion of said first cam track so that said core member is in said retracted position thereof when said top form is in said maximal angularly displaced position thereof.

5. A baking device, comprising, in combination, a mold means composed of two mold halves, and of pivot means connecting said two mold halves for pivotal movement about a pivoting axis between a closed position in which said mold halves define a molding chamber, and an angularly displaced open position, each of said mold halves being formed with at least one bore, said bores being arranged coaxial with each other on opposite ends of said molding chamber and having an axis extending normal to said pivoting axis; at least one core member slidably mounted in said bores and being movable between an advanced position extending through said molding chamber and being supported in said two bores, and a retracted position retracted from said molding chamber and being supported only in one of said bores located in one of said mold halves, and releasing the other of said mold halves for pivotal movement, said constricted portion being located in said one of said bores in said advanced position of said core member so that pivotal movement of the other of said mold halves toward said open position effects bending of said core member about said constricted portion whereby a baked article is separated from said one mold half; a first cam means associated with said other mold for moving the same to said open position; and a second cam means associated with said core member for moving the same between said advanced and retracted positions, said first and second cam means being so shaped as to simultaneously move said other mold half to said open position, and said core member to said retracted position during relative movement between said mold means on one hand, and said first and second cam means on the other hand in the direction of said pivoting axis.

6. A baking device comprising, in combination, a mold means composed of two mold halves; pivot means connecting said mold halves for pivotal movement about a pivoting axis between a closed position in which said mold halves define a molding chamber and an open position turned relative to each other, one of said mold halves being formed with a hole; engaging means on the inner surface of the other of said mold halves located opposite said hole in said one mold half when said two mold halves are in said closed position; a core member arranged passing through said hole and being supported within the same slidable in axial direction and projecting into said molding chamber defined by said mold halves in said closed position thereof, said core member being movable between an advanced position engaging said engaging means on said other mold half and holding said mold halves in said closed position, and a retracted position permitting turning of said mold halves into said open position; and operating means for moving said core member between said advanced and retracted positions.

7. A baking device comprising, in combination, a mold means composed of two mold halves; pivot means connecting said mold halves for pivotal movement about a pivoting axis between a closed position in which said mold halves define a molding chamber and an open position turned relative to each other, one of said mold halves being formed with a hole; engaging means on the inner surface of the other of said mold halves located opposite said hole in said one mold half when said two mold halves are in said closed position; a core member arranged passing through said hole and being supported within the same slidable in axial direction and projecting into said molding chamber defined by said mold halves in said closed position thereof, said core member being movable between an advanced position engaging said engaging means on said other mold half and holding said mold halves in said closed position, and a retracted position permitting turning of said mold halves into said open position; and operating means for moving said core member between said advanced and retracted positions, and for turning the other of said mold halves about said pivoting axis.

8. A baking device, comprising, in combination, a mold means composed of two mold halves; pivot means connecting said mold halves for pivotal movement about a pivoting axis between a closed position in which said mold halves define a molding chamber and an open position turned relative to each other, one of said mold halves being formed with a hole; engaging means on the inner surface of the other of said mold halves located opposite said hole in said one mold half when said two mold halves are in said closed position; a core member arranged passing through said hole and being supported within the same slidable in axial direction and projecting into said molding chamber defined by said mold halves in said closed position thereof, said core member being movable between an advanced position engaging said engaging means on said other mold half and holding said mold halves in said closed position, and a retracted position permitting turning of said mold halves into said open position; cam means movable relative to said mold means in the direction of said pivoting axis; and two cam follower means secured to said other of said mold halves and to said core member, respectively, and being engaged by said cam means so that relative movement between said mold means and said cam means simultaneously effects movement of said core member between said advanced and retracted positions, and turning of said other of said mold halves about said pivoting axis.

9. A baking device comprising, in combination, a mold means composed of two mold halves; pivot means connecting said mold halves for pivotal movement about a pivoting axis between a closed position in which said mold halves define a molding chamber and an open position turned relative to each other, one of said mold halves being formed with a hole; engaging means on the inner surface of the other of said mold halves located opposite said hole in said one mold half when said two mold halves are in said closed position; a core member arranged passing through said hole and being supported within the same slidable in axial direction and projecting into said molding chamber defined by said mold halves in said closed position thereof, said core member being movable between an advanced position engaging said engaging means on said other mold half and holding said mold halves in said closed position, and a retracted position permitting turning of said mold halves into said open position; first cam means associated with the other of said mold halves for turning the same about said pivoting axis; and second cam means associated with said core member for moving the same between said advanced and retracted positions, said first and second cam means being so shaped as to simultaneously move said other of said mold halves to said open position, and said core member to said retracted position during relative movement in the direction of said pivoting axis between said mold means on one hand, and said first and second cam means on the other hand.

10. A baking device comprising, a combination, a mold means composed of two mold halves; pivot means connecting said mold halves for pivotal movement about a pivoting axis between a closed position in which said mold halves define a molding chamber and an open position turned relative to each other, one of said mold halves being formed with a hole; engaging means on the inner surface of the other of said mold halves located opposite said hole in said one mold half when said two mold halves are in said closed position; a core member having a constricted flexible portion and being arranged passing through said hole and being supported within the same slidable in axial direction and projecting into said molding chamber defined by said mold halves in said closed position thereof, said core member being movable between an advanced position engaging said engaging means on said other mold half and holding said mold halves in said closed position, and a retracted position permitting turning of said mold halves into said open position, said constricted portion of said core member being located in said hole in said advanced position of said core member so that pivotal movement of said other of said mold halves toward said open position effects bending of said core member in said advanced position about said constricted portion whereby the baked article is separated from said one mold half; and operating means for moving said core member between said advanced and retracted positions, and for turning the other of said mold halves about said pivoting axis.

References Cited in the file of this patent

UNITED STATES PATENTS

| Number | Name | Date |
|---|---|---|
| 300,409 | Taylor | June 17, 1884 |
| 754,131 | Forcke | Mar. 8, 1904 |
| 1,342,045 | Hamwi | June 1, 1920 |
| 1,646,726 | Ehrgott | Oct. 25, 1927 |
| 1,781,411 | Reiber | Nov. 11, 1930 |
| 1,990,412 | Merritt | Feb. 5, 1935 |
| 2,009,791 | Schroyer | July 30, 1935 |
| 2,122,320 | Kahn | June 28, 1938 |
| 2,571,891 | Kassan et al. | Oct. 16, 1951 |
| 2,589,823 | Krens | Mar. 18, 1952 |

FOREIGN PATENTS

| Number | Country | Date |
|---|---|---|
| 11,849 | Great Britain | June 1, 1908 |